United States Patent

[11] 3,617,566

[72] Inventors: Katsutoshi Oshima, Tokyo; Jiro Kajiyama, Tokyo; Shin Fukumoto, Tokyo; Nobuo Nagao, deceased, late of Yokohami-shi, by Aiko Nagao, legal representative, all of Japan
[21] Appl. No.: 773,058
[22] Filed: Nov. 4, 1968
[45] Patented: Nov. 2, 1971
[73] Assignee: By said Oshima, said Kajiyama, said Fukumoto and Aiko Nagao legal representative of Nobuo Nagao deceased to Osman Kogyo Kabushiki Kaisha Tokyo, Japan
[32] Priorities: Nov. 6, 1967
[33] Japan
[31] 42/70928; Apr. 27, 1968, Japan, No. 43/34244; May 2, 1968, Japan, No. 43/35413; July 12, 1968, Japan, No. 43/48470

[54] METHOD AND MATERIAL FOR SEPARATING OIL FROM OIL-CONTAINING WATER
13 Claims, 4 Drawing Figs.

[52] U.S. Cl. .................................................. 210/40, 210/242, 210/282, 210/484, 210/DIG. 21
[51] Int. Cl. .................................................. E02b 75/04
[50] Field of Search .................................................. 210/36, 39, 40, 266, 282, 484, 502, 502, DIG. 21; 252/426, 428

[56] References Cited
UNITED STATES PATENTS

| | | | |
|---|---|---|---|
| 2,063,086 | 12/1936 | Fitzgerald | 210/282 |
| 2,361,092 | 10/1944 | Gilbert et al. | 210/502 X |
| 2,367,384 | 1/1945 | Tymstra et al. | 210/40 X |
| 2,399,158 | 4/1946 | Armaly | 210/484 |
| 2,464,204 | 3/1949 | Baker | 210/40 X |
| 3,115,459 | 12/1963 | Giesse | 210/484 |
| 3,147,216 | 9/1964 | Oemler | 210/40 |
| 3,198,731 | 8/1965 | DeLew | 210/42 |
| 3,252,270 | 5/1966 | Pall et al. | 210/505 X |
| 3,334,042 | 8/1967 | Teitsma | 210/40 X |
| 3,382,170 | 5/1968 | Pape | 210/40 X |
| 3,441,140 | 4/1969 | Thurber | 210/282 X |
| 3,464,920 | 9/1969 | Pirson et al. | 210/36 X |

Primary Examiner—Samih N. Zaharna
Attorney—Fred C. Philpitt

ABSTRACT: Oil is separated from oil-containing water by contacting the oil-containing water with an adsorbing material consisting mainly of atactic, noncrystalline polypropylene having a molecular weight of 10,000 to 100,000.
Straw, wood wool, or natural fibers can be used as a carrier for the atactic-noncrystalline polypropylene.

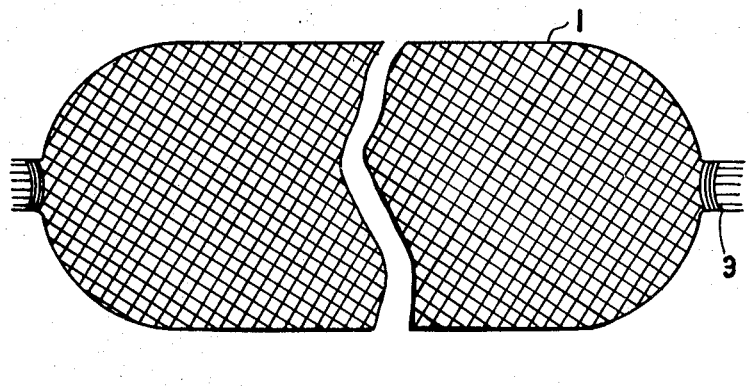
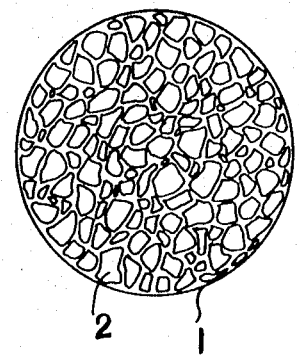
FIG. 1  FIG. 2
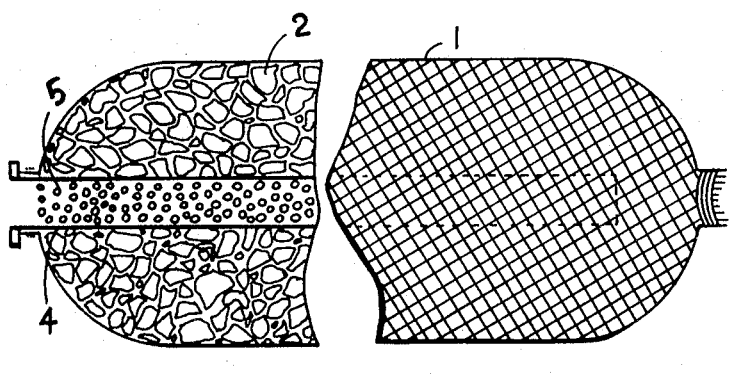
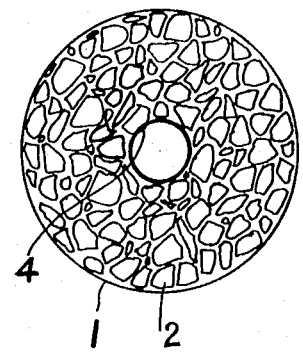
FIG. 3  FIG. 4

METHOD AND MATERIAL FOR SEPARATING OIL FROM OIL-CONTAINING WATER

The present invention relates to a method and material for separating oil from water, and more particularly to a method and material for separating oil floating on water surface or being suspended as colloidal particles in water, using an adsorbing material mainly consisting of noncrystalline, atactic polypropylene.

Removal of oil floating on water surface or suspended in water as colloidal particles is very important for water treatment and prevention of public nuisance, and there have been heretofore proposed the following methods:

1. A method based on coagulation of oil by a coagulant consisting mainly of surface-active agent and successive collection of coagulated oil floating on water surface.
2. A method based on emulsification and dispersion of oil by an emulsifying agent consisting mainly of detergent and kerosene.
3. A method based on adsorption of oil on a mixture of clay or diatomaceous earth and a surface-active agent and successive sedimentation of oil-adsorbed clay or diatomaceous earth from water surface, and
4. A method based on collection of oil using floatable material of natural fibers such as wheat straws as an adsorbing carrier.

However, these methods still have drawbacks and are not deemed effective ones.

For example, the method (1) was developed in Germany some years ago, and as the coagulated oil is in a semifluid state and thus it is necessary to subject the collected coagulated oil to further oil-water separation and heating. Furthermore, it is a disadvantage to use a large amount of expensive coagulant.

The method (2) is based simply on the emulsification and dispersion, and thus oil is not removed from water essentially and consequently there are cases that the quality of water becomes much worse. Further, the emulsifying agent itself is expensive and it is said that in case of heavy oil treatment, the treating cost is about five times as expensive as the cost of heavy oil treated. Furthermore, in some countries regulations for prohibiting the use of such method are in force on the ground of water quality deterioration. Thus, the method (2) is not preferable.

The method (3) is based on the sedimentation, of oil-adsorbed clay or diatomaceous earth and thus does not required so much labor in the treatment, but the sedimented adsorbed oil cannot be recovered.

The method (4) is widely used in the world, but the adsorbing capacity of adsorbing carrier is small and consequently, a large amount of wheat straws are necessary to use. The wheat straws rot when they are made wet or humid, and thus cannot be stored in open air in a high humid country like Japan: hence the procurement in emergency is difficult. Oil-adsorbed straws also adsorbs water, and the disposal of the oil-adsorbed straws is difficult after landing. The oil-adsorbed straws are usually burned.

For sludge cleaning of oil tank of crude oil tanker, fuel oil tank of ship, or oil tank on land or cleaning for repair, it is necessary to use a large amount of surface-active agent and waste cloths, as well as much labor and time.

Furthermore, for the treatment of waste cleaning liquor including oil from the tanker or ship oil tank, it is necessary to employ a number of barges for carrying such waste cleaning water as well as a large scale oil-water separator, and further heating is necessary for such treatment.

Accordingly, the cleaning operation becomes very expensive.

An object of the present invention is to provide a method and material for removing oil floating on water surface or being suspended in water in the form of colloidal particles.

Another object of the present invention is to provide a method and material for considerably reducing costs required for separation of oil and water at the purification of various oil tanks as well as cleaning of oil.

In the present invention, these objects can be attained by utilizing noncrystalline, atactic polypropylene.

The present invention is to provide a method and material for removing oil from a mixture of water and oil, from water surface or from oil-attached wall surface of a vessel, which comprises allowing noncrystalline, atactic polypropylene having a molecular weight of 10,000 to 100,000 surface-active agent-containing noncrystalline, atactic polypropylene, or noncrystalline, atactic polypropylene-coated carrier material such as wood wool, straws, natural fibers, to come in contact with said oil thereby to adsorb said oil on polypropylene. The molecular weight, as referred to herein, means a mean molecular weight obtained by inserting an intrinsic viscosity $[\eta]$ as measured in tetraline at 135° C. into the following equation:

$$[\eta]=1.93\times10^{14}\times Mn^{0.74}$$

The noncrystalline, atactic polypropylene used in the present invention is a byproduct polypropylene having a molecular weight of from 10,000 to 100,000 obtained when crystalline polypropylene is prepared, and has not been heretofore utilized in the industry and burned as a waste material. The noncrystalline, atactic polypropylene is separated from crystalline polypropylene in a process for preparing crystalline polypropylene and obtained in a state where the noncrystalline polypropylene is dissolved in an inert solvent for polymerization. In order to recover the inert solvent from the noncrystalline polypropylene, the noncrystalline polypropylene and inert solvent are to be separated. In that case, the noncrystalline polypropylene is obtained in a granular, or porous granular or powdery state.

When the noncrystalline polypropylene is obtained in a lump state, such lump is pulverized to a flaky or granular state. In one embodiment of the present invention, powdery, granular or flaky polypropylene is preferably used. The amount of atactic polypropylene is 10 to 100 percent by weight on the basis of weight of oil to be recovered, but depends upon the species of oil. Thus, it is preferable to conduct a preliminary test to determine the amount of polypropylene to be added. Of course it is advantageous to use atactic polypropylene in the form as porous as possible. In order to separate and remove oil floating on water surface or being mixed with water, the noncrystalline polypropylene is added to water in said state as it is or added to water together with such an assisting agent as surface-active agent.

The noncrystalline polypropylene is water-repellant but has an affinity toward oil and thus well adsorbs oil. Thus, the object of adsorbing and catching oil can be attained with a small amount of noncrystalline polypropylene.

In another embodiment of the present invention, a noncrystalline, atactic polypropylene-coated material is used to separate and recover oil from water surface. The carrier material for polypropylene is such a material having a lower apparent specific gravity than water such as wood wool, straws or natural fibers, and is coated with noncrystalline polypropylene by dissolving noncrystalline polypropylene into a solvent and applying the thus obtained solution to the surface of carrier material or by melting said polypropylene without using any solvent and dipping said carrier material into molten polypropylene.

According to the solvent method, it is possible to coat one part by weight of carrier material with about one to about three parts by weight polypropylene and according to the melting method, it is possible to coat one part by weight of carrier material with five to 10 parts by weight of polypropylene. The carrier material is thus uniformly coated with the noncrystalline, atactic polypropylene and has its original shape on account of the rigidity of the carrier material itself. The thus obtained adsorbing material has a large surface area.

When wood wool, straws or natural fibers are used singly, as an oil-adsorbing material, adsorption of oil is interrupted if the adsorbing material adsorbs water at first. Even if oil is adsorbed thereon at first, the adsorbed oil is released from the adsorbing material by the successive absorption of water. Further, the specific gravity of the adsorbing material increases with the absorption of water and thus the water-absorbed material gradually sinks below the water surface and is settled.

The polypropylene-coated oil adsorbing material prepared according to the present invention never releases oil, once the oil has been adsorbed thereon, and further as the carrier material is entirely coated with water-repellant atactic, noncrystalline polypropylene, the adsorbing material will never absorb water, thus never undergoes increase in specific gravity and can be always kept floating on water surface.

In case of the wood wool, the polypropylene-coated wood wool has a higher buoyancy than the single atactic, noncrystalline polypropylene has, and can be kept floating on water surface for a longer period of time. Further, the wood wool is prevented from decaying by such polypropylene coating.

The advantages of the present adsorbing material are enumerated as follows:
1. Only oil is selectively adsorbed, and the atactic noncrystalline polypropylene itself is water-repellant and thus the adsorbing material is never made wet with water.
2. The atactic, noncrystalline polypropylene commercially available is ordinarily porous or has an irregular surface, and thus the surface area is very large. Accordingly, the adsorbing effect upon oil of the present adsorbing material is about 10 times as large as that of the conventionally used straw.
3. Powdery atactic, noncrystalline polypropylene-adsorbing material has a true density of 0.85 and bulk density of 0.1 to 0.3, and is convenient to handle owing to its light weight.
4. Collection of oil-adsorbed atactic, noncrystalline polypropylene-adsorbing material in water can be simply made for example by a net because the present adsorbing material is a floatable solid.
5. Once oil is adsorbed on the present adsorbing material, adsorbed oil is hardly released therefrom by mere hand rubbing. Water retained between clearances can be readily removed by draining off water after the collected adsorbing material has been stored in a storing place or bag.
6. Oil-adsorbed atactic, noncrystalline polypropylene or material coated therewith can be burned as fuel as well as those which have not adsorbed oil (For example, a very good result can be obtained when atactic polypropylene is utilized in limestone firing.
7. The atactic, noncrystalline polypropylene itself is produced as a petrochemical byproduct at a low cost and in a large amount. Further, its supply is very stable.
8. The atactic, noncrystalline polypropylene never undergoes decomposition or deterioration in quality with time, and thus can be stored in an open air.

In order to effectively conduct removal of oil floating on water surface or being suspended in water as well as purify water, it is preferable to use a method for forcibly passing oil-contaminated water through a vessel packed with said noncrystalline polypropylene-adsorbing material. For example, in treating a large amount of a mixture of water and oil, that is, in separating oil contained in ballast water in a tanker, oil can be separated in a very short period of time with minimum labor for forcibly passing oil-contaminated water through a cylindrical vessel packed with atactic, noncrystalline polypropylene-adsorbing material, by means of a pump, while the adsorbing material is supported at both ends with wire nettings having a size of for example 10 mesh. In such a case, it has been necessary in separating oil in a suspended state according to the conventional method, to use a large oil-water separator and apply heat thereto. On the other hand, the suspended oil can be cleanly separated from water according to the present invention, and thus the oil-separated water can be discharged as it is, without any trouble.

Further, it has been difficult to remove oil from the oil-sticked wall surface of an empty oil tank, and it has been necessary to wipe out oil from the wall surface with a waste cloth. However, according to the present invention, oil can be removed from the wall surface by placing the atactic, noncrystalline polypropylene-adsorbing material in an empty oil tank, further adding a large amount of water thereto, and stirring water in the tank. Such separation is based on the fact that the atactic, noncrystalline polypropylene-adsorbing material rubs the oil-sticked wall surface by the stirring as if the wall were wiped with a waste cloth, and consequently oil is released from the wall surface, and the released oil is adsorbed onto the atactic, noncrystalline polypropylene-adsorbing material. Then, the solution mixture containing the oil-adsorbed polypropylene-adsorbing material is withdrawn from the tank and passed through a wire netting, whereby only the polypropylene-adsorbing material is collected on the wire netting. In that case, a layer of the collected polypropylene-adsorbing material helps further filtering operation as in the ordinary filtering operation.

Any surface-active agent can be used as an assisting agent, but in the case the surface active agent is added to the atactic, noncrystalline polypropylene, it is preferable to use 0.5 to 20 percent by weight of surface-active agent on the basis of the atactic, noncrystalline polypropylene.

In another preferable mode of removing oil floating on the water surface according to the present invention, granular, flaky, or lump atactic, noncrystalline polypropylene-adsorbing material packed in a bag knitted with polyethylene or polypropylene threads or preferably with their monofilaments, are effectively employed as an oil fence element for catching oil floating on water surface.

In other preferable mode of removing oil from water according to the present invention, granular, flaky or lamp atactic noncrystalline-adsorbing material packed in a bag knitted with polyethylene or polypropylene threads or preferably with their monofilaments, are effective utilized as an oil separator, by inserting a perforated tube having a closed end into the bag to supply oil-contaminated water.

These modes of operation are explained hereunder with reference to the drawings:

FIG. 1 is a partly cutaway side view of an oil-fence element according to the present invention;

FIG. 2 is a cross-sectional view of the oil fence element of FIG. 1;

FIG. 3 is a partly cutaway side view of oil separator according to the present invention; and FIG. 4 is a cross-sectional view of the oil separator of FIG. 3.

In FIGS. 1 and 2 a cylindrical bag 1 knitted with polyethylene or polypropylene threads or monofilaments is packed with flaky atactic, noncrystalline polypropylene-adsorbing material 2 or a mixture of these material and polyurethane foam. Both ends of the bag are closed with a thread, thereby an oil fence element is built up. The thus built-up oil fence elements are connected with one another in series to form an oil fence. The present oil fence can keep a stable floating state on water surface and can be used in a straight form, curved form or loop form, depending upon the situation in preventing floating oil on water surface from flowing away or in collecting floating oil in the inside of the loop made by the fence. As the present oil fence consists of nettings and adsorbing material packings having clearances, water can be freely passed and thus the present oil fence is never turned around by the waves. As a result oil floating on water surface can never pass over the present oil fence. On the contrary, when water-containing oil passes through the present oil fence, only oil is adsorbed on the oil fence. Excess unadsorbed oil is retained by the fence, and the retained oil is further adsorbed on the powdery, granular, flaky or lamp atactic, noncrystalline polypropylene adsorbing material by spraying the same over said retained oil, or by passing the retained oil through the present oil separator shown in FIGS. 3 and 4.

In FIGS. 3 and 4, a cylindrical bag 1 knitted with polyethylene or polypropylene thread, or monofilaments is packed with flaky atactic, noncrystalline polypropylene-adsorbing material 2. A perforated pipe 4 having one closed end is inserted into the cylindrical bag along the centerline of the cylindrical bag so that the closed end may be within the bag. The other open end outside the bag is connected to a pipe for supplying an oil-containing water. The entire bag is allowed to float on water surface. By supplying the oil-containing water to the perforated pipe 4, the oil-containing water is injected through perforations 5 into the inside of the bag. Only oil is adsorbed and caught by packings of the flaky atactic, noncrystalline polypropylene-adsorbing material, and water leaks through the clearances between packings to the outside of the bag. Water can pass through the packing clearances and surrounding nettings with less resistance.

The present oil separator can be conveniently and efficiently utilized in combination with said oil fence. The advantages of the present oil separator are enumerated below:
1. Lightweight and floatable on water. Thus, oil separation can be effected on water surface.
2. Readily assemblable at working site.
3. No trouble with vigorous handling as well as contamination.
4. A large volume of water is treatable because of less resistance.
5. Structural material itself is cheap.
6. Nether heat nor power except that for pumping is required.
7. Saturated packing can be thrown away together with netting after only pipe is disengaged.

The present invention is explained hereunder with reference to examples:

EXAMPLE 1

Five hundred kilograms of atactic, noncrystalline polypropylene granules having sizes of 1 to 3 mm. and its aggregate was sprayed in a dockyard (depth of water: 8 m.; length: 150 m.; and width: 100 m.) in which about 1,000 L of C heavy oil locally floated on water surface, and the sprayed adsorbing material was collected at one position using a net with floats and transferred onto land by a crave. Cleaning was thereby completed. Man-hour required for that treatment was 8 man-days.

For the same treatment, 150 drums of dispersing agent (2,500 per drum) were used to emulsify the floating oil. The man-hour required for that treatment was 60 man-days.

It was found that the cleaning based on the present method was more complete than, that based on the conventional method, and further that considerable saving in man-hour could be attained, as stated above.

EXAMPLE 2

In sludge-removing work tank having a capacity of 5,000 tons, placed on land and used for B heavy oil, 10 tons of atactic, noncrystalline polypropylene granules were added to 80 tons of residual sludge (20 percent oil and 80 percent sludge water), and further 100 tons of water was added thereto. After oil was adsorbed on said adsorbing material, water was drained off the adsorbing material, using a bag. The filtrate water could be discharged to the ordinary drain pit (no oil was contained in filtrate water). The man-hour required therefor was 4 man-days, and finishing with waste cloths was not necessary.

In the conventional method, about 40 man-days were required, and the discharged water could not be thrown away through the ordinary drain pit without further oil separation from the discharged water.

EXAMPLE 3

For cleaning of a light oil tank having a volume of 100 m³ (one section: 5 m³) at ship bottom, about 10 tons of atactic, noncrystalline polypropylene granules and 80 m³ of sea water were added to the tank. The man-hour required for that work was 10 man-days. In the conventional method, about 40 man-days were required. Further, the work could not be started for 2 days after manholes were opened for venting gas from the light oil in the conventional method. Such preparatory period was not necessary at all in the present method. No sticked oil was found on wall surface, and workers did not get dirty and no waste cloths were used at all. Thus, a remarkable cleaning effect could be attained.

EXAMPLE 4

In treating ballast water of a 50,000 ton ship, a cylindrical filter (1.5 m. Φ×6 m.) was used. About 3 tons of atactic, noncrystalline polypropylene powders was added to 9.3 m.³ of ballast water containing about 1 percent of oil, and water was pumped to said filter and forcibly passed therethrough. Oil content of discharged water reduced to 20 p.p.m.

EXAMPLE 5

Wood wool was dipped in a solution consisting of 30 parts by weight of atactic polypropylene having a molecular weight of 15,000 and 70 parts by weight of toluene at 50° C., and taken out therefrom. Then, toluene was removed by evaporation, whereby a polypropylene-coated wood wool consisting of one part by weight of wood wool and about one to three parts by weight of atactic polypropylene was obtained. The thus obtained adsorbing material had a very remarkable adsorption effect upon floating oil. That is, about one to three parts by weight of oil was adsorbed on one part by weight of adsorbing material. No release of oil from the adsorbing material by water was observed at all.

EXAMPLE 6

Wood wool was dipped in molten atactic polypropylene having a molecular weight of 10,000 at 180° C. and taken out therefrom and air-cooled, whereby propylene-coated wood wool consisting of one part by weight of wood wool and five to 10 parts by weight of atactic polypropylene was obtained, while keeping the original wood wool clearances.

In the adsorbing material prepared by such melting method, only about one part by weight of oil was instantly adsorbed on one part by weight of adsorbing material, but the swelling layer was so thick after adsorption that the adsorbing effect was more durable than that based on the solvent method. After 3 hours, the amount of oil adsorption reached five to 10 parts by weight per one part by weight of adsorbing material.

When the wood wool was to be coated with atactic polypropylene according to the melting method, it was found that the wood wool was charred at a temperature above 220° C., and it is necessary that the temperature of wood wool be below 220° C. even locally.

EXAMPLE 7

A 40-cm. Φ cylindrical bag knitted with polyethylene monofilaments of 400 denier was packed with atactic, noncrystalline porous polypropylene flakes having sizes of 20 to 30 mm., and both ends of the bag was closed with threads, whereby an oil fence element was obtained. Oil fence consisting a plurality of the oil fence elements and having a length of about 5 m. was immersed in a drain pit through which water-containing oil was flowing, and used as an oil fence. Further, a fence having a length of 20 m. was placed in a semicircular state at a place where waste water was discharged to sea. In both cases, good results were obtained. When the waste sea water having 0.5 to 1 percent of oil dispersed on water surface was treated in said fence, the oil content was reduced to 10 p.p.m.

EXAMPLE 8

A cylindrical bag knitted with polyethylene monofilaments having 400 denier (bag diameter: 60 cm.; length: 5 m.) was packed with atactic, noncrystalline polypropylene flakes having sizes of 20 to 30 mm., and then a perforated polyvinyl chloride pipe having a closed end, a diameter of 4 inches, and about 300 perforations having a size of 1 mm. was inserted along the centerline of bag so that the closed end of pipe may be located within the bag. To other end of the pipe was connected to a waste water pipe, and the entire bag was floated on water surface. One hundred Tons per hour of Ballast water containing 800 p.p.m. of oil was passed through said oil separator, whereby water containing 20 p.p.m. of oil was obtained.

We claim:

1. A method for separating oil from water-containing oil, which comprises contacting oil-containing water with an adsorbing material consisting mainly of atactic, noncrystalline polypropylene having a molecular weight of 10,000 to 100,000 and thereby adsorbing only oil onto the adsorbing material.

2. A method according to claim 1, wherein the adsorbing material is powdery, flaky, granular or lump atactic, noncrystalline polypropylene.

3. A method according to claim 1, wherein the adsorbing material is used in the presence of a surface-active agent.

4. A method according to claim 1, wherein the adsorbing material consists of atactic, noncrystalline polypropylene-coated wood wool, straws or natural fibers.

5. A method according to claim 1, wherein the adsorbing material consists of a bag packed with packings consisting mainly of atactic, noncrystalline polypropylene.

6. A method according to claim 5, wherein the bag is knittings of polyethylene or polypropylene threads or monofilaments.

7. A method according to claim 5, wherein the adsorbing material has a means for feeding the oil-containing water into the bag and oil is adsorbed on packings consisting mainly of atactic, noncrystalline polypropylene while the oil-containing water passes from said feeding means through said packing outwards.

8. A method according to claim 1 wherein the adsorbing material is a mixture of powdery, flaky, granular or lump of atactic, noncrystalline polypropylene and polyurethane foam.

9. An oil-adsorbing material for separating oil from oil-containing water which comprises wood wools, straws or natural fibers as a carrier and atactic, noncrystalline polypropylene having a molecular weight of 10,000 to 100,000, said wood wools, straws or natural fibers being coated with said polypropylene.

10. An oil-adsorbing structure for separating oil from oil-containing water which comprises a bag and packing consisting mainly of atactic, noncrystalline polypropylene and wherein said bag is provided with a perforated tube for introducing oil-containing water, having one closed end and one opened end, the closed end being located in the inside of the bag and the open end being located at the outside of the bag and connected to an oil-containing water feeding source.

11. An oil-adsorbing structure according to claim 10 wherein the bag is knittings of polyethylene or polypropylene threads or monofilaments.

12. A fence for collecting oil which is floating on water surface which comprises a plurality of fence elements which comprise netlike elongated bags containing buoyant-packed materials consisting mainly of atactic, noncrystalline polypropylene; each of said elements having clearances so that water can be freely passed therethrough and being connected with one another to form said fence which is capable of catching oil floating on a water surface, and which is capable of keeping a stable floating state on water surface.

13. An oil-adsorbing structure according to claim 12 wherein the bag is knittings of polyethylene or polypropylene threads or monofilaments.